UNITED STATES PATENT OFFICE.

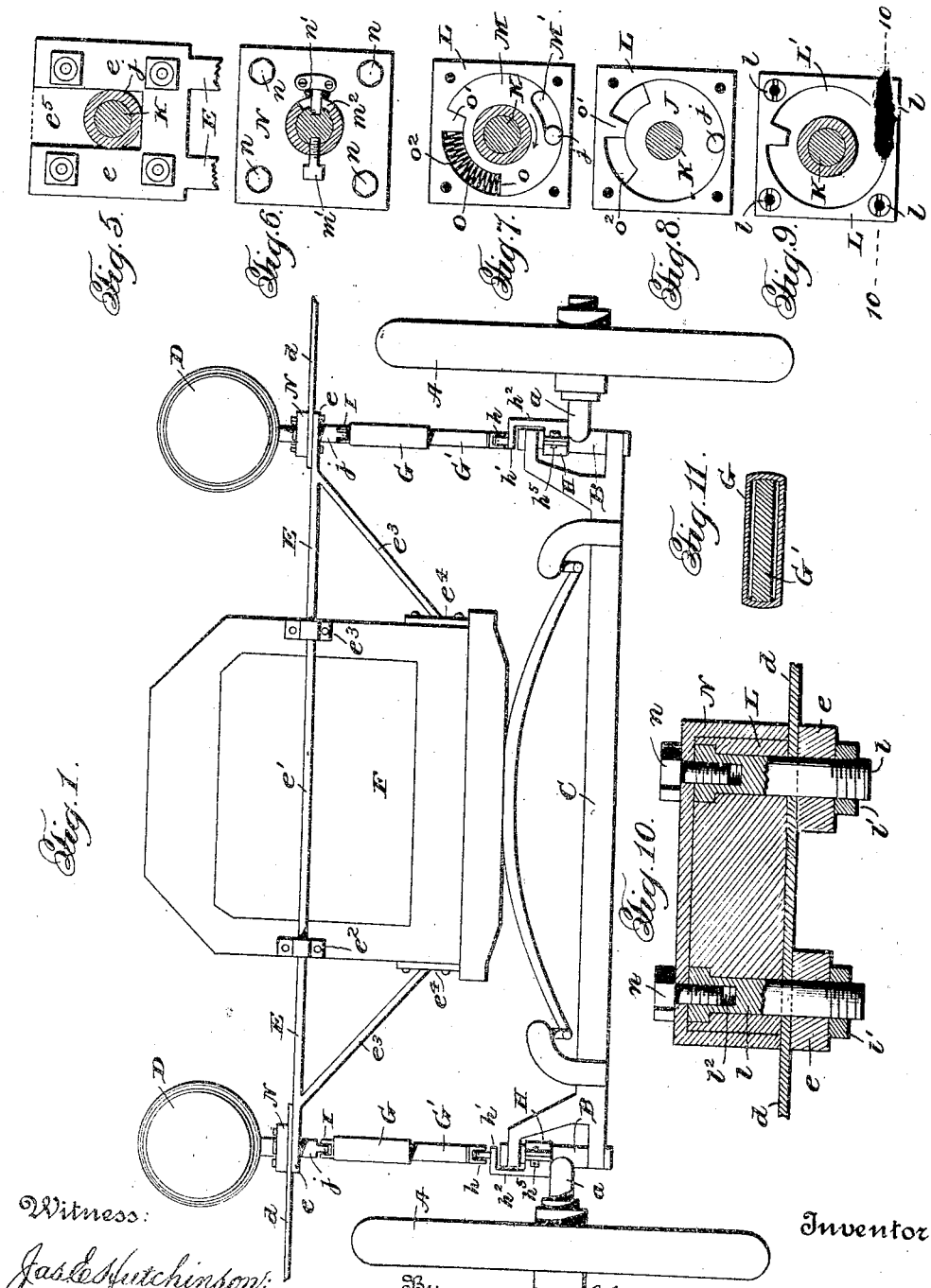

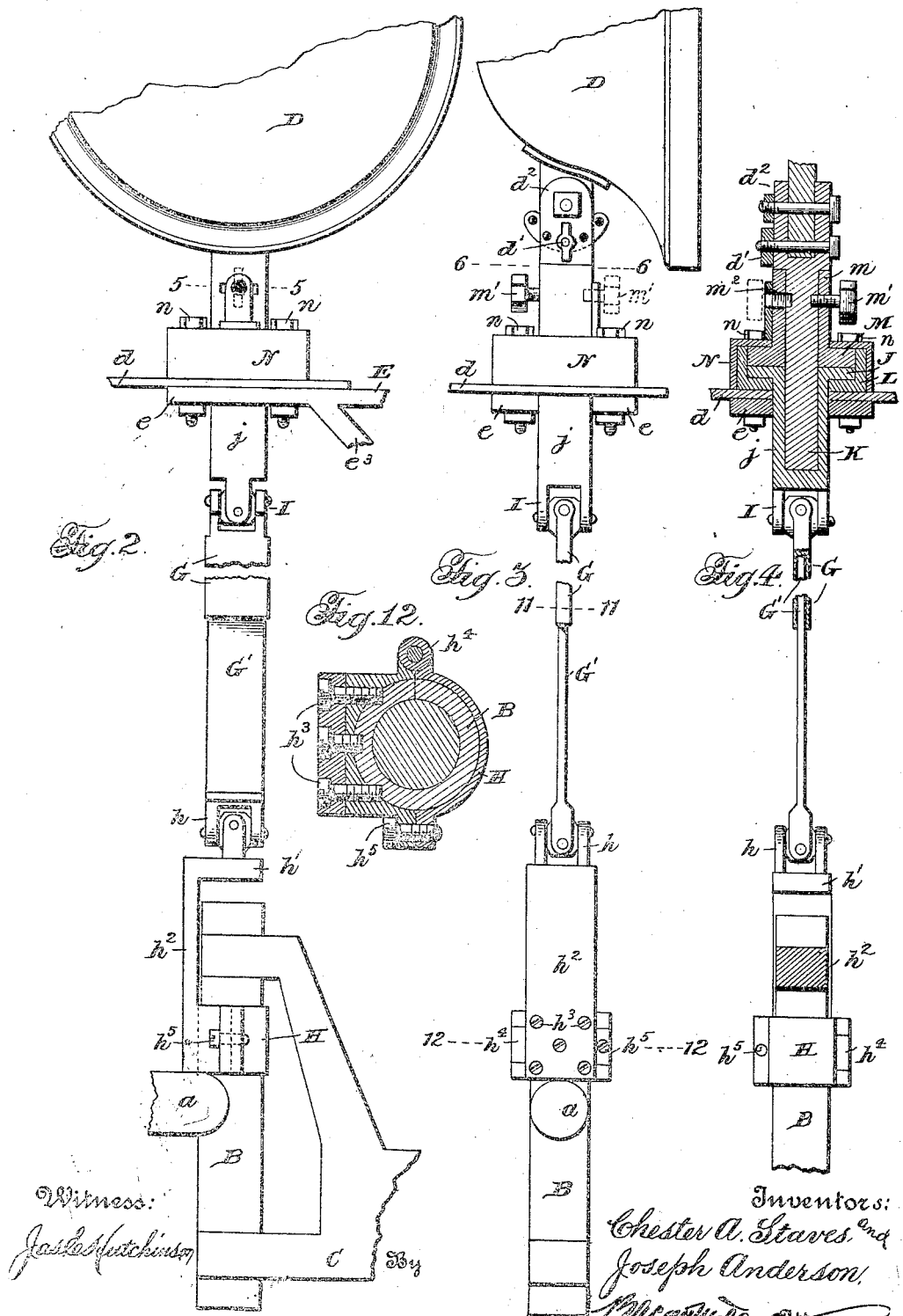

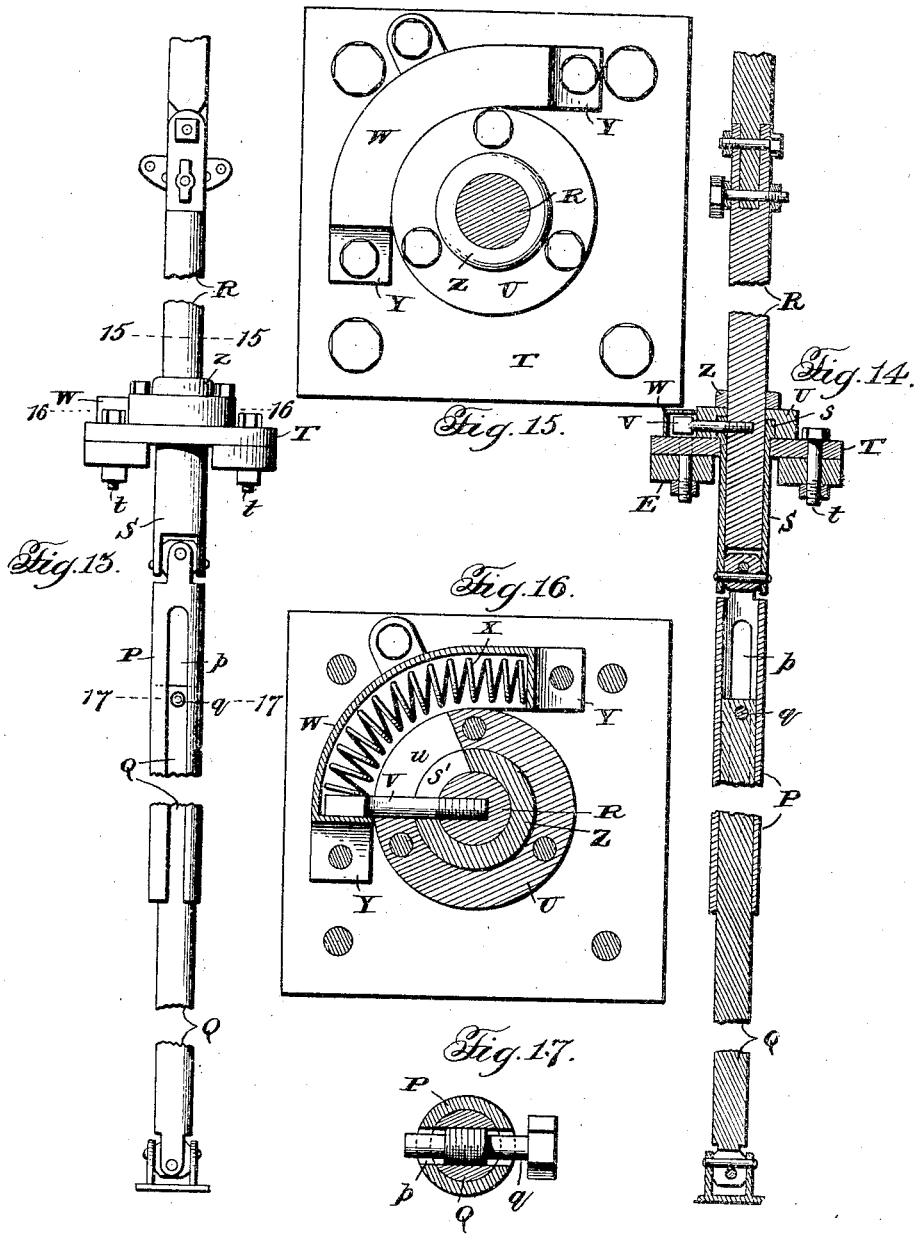

CHESTER A. STAVES AND JOSEPH ANDERSON, OF TULSA, OKLAHOMA, ASSIGNORS, BY DIRECT AND MESNE ASSIGNMENTS, OF TWO-THIRDS TO SAID STAVES AND ONE-THIRD TO SAID ANDERSON.

AUTOMOBILE-LAMP.

1,235,078.  Specification of Letters Patent.  Patented July 31, 1917.

Application filed March 3, 1916. Serial No. 81,987.

*To all whom it may concern:*

Be it known that we, CHESTER A. STAVES and JOSEPH ANDERSON, citizens of the United States, both residing at Tulsa, in the county of Tulsa and State of Oklahoma, have invented certain new and useful Improvements in Automobile-Lamps, of which the following is a specification, reference being had therein to the accompanying drawing.

This invention relates to automobile head lights and has for its object the provision of improvements in mountings and actuating mechanisms for lamps permitting the shifting of the same so that the light rays may be correspondingly thrown to the right or left, as the case may be in consonance with the direction of turning movement of the vehicle.

More specifically the said improvements comprise means acting automatically to hold what may be styled the outside lamp straight or longitudinally of the vehicle while forcing the other or inside lamp to turn bodily to follow the curve defined by the movement of the vehicle as determined by the steering devices or wheels of said vehicle.

Many important features in detail of construction and arrangement of associated parts will be apparent from the specific description hereinafter contained when read in connection with the accompanying drawings forming part hereof, and wherein two embodiments of the invention, in practical form, are illustrated.

In the drawings:

Figure 1 is a front view of an automobile provided with my improved lamps and connecting parts thereof;

Fig. 2 is an enlarged front elevation of one of the lamps and immediately associated parts;

Fig. 3 is a side view of the same;

Fig. 4 is a vertical sectional view;

Fig. 5 is a sectional view on the line 5—5 of Fig. 2 looking upward;

Fig. 6 is a sectional view on the line 6—6 of Fig. 3 looking downward;

Fig. 7 is a sectional view on a line immediately above the upper disk;

Fig. 8 is a similar view immediately above the lower disk;

Fig. 9 is a top view of the base member with the top and bottom disk members removed therefrom;

Fig. 10 is a sectional view on the line 10—10 of Fig. 9;

Fig. 11 is a sectional view on the line 11—11 of Fig. 3;

Fig. 12 is a sectional view on the line 12—12 of Fig. 3;

Fig. 13 is an elevation of a modified form of the invention;

Fig. 14 is a vertical sectional view of the same;

Fig. 15 is a sectional view on the line 15—15 of Fig. 13 looking downward;

Fig. 16 is a sectional view on the line 16—16 of Fig. 13 also looking downward; and Fig. 17 is a sectional view on the line 17—17 of Fig. 13.

Referring more specifically to the drawings wherein like reference letters refer to corresponding parts in the several views, and first with particular reference to the first twelve figures, A represents the steering wheels of a motor vehicle carried by the spindles $a$ connected to the vertically rotatable sleeves B at the ends of the axle C.

D are the usual head lights, in this instance mounted above the fenders $d$ and rigidly secured at proper distances apart by means of a brace E having flat extensions $e$ underlying the fenders, an intermediate portion $e'$ fitted in brackets $e^2$ on the face of the radiator frame F, and diagonal supports $e^3$ running from points adjacent to the flattened extension $e$ to points of fastening $e^4$ at the side of said radiator casing.

The flattened extensions $e$ are open at their ends as indicated at $e^5$ of Fig. 5 to enable the passage of the vertically disposed lamp actuating means now to be defined.

G, G' are telescoping members capable of elongating or shortening in keeping with the spring action of the vehicle, these members constituting the main connection between the lamp and the steering wheels.

The lower end of the member G' has a universal coupling action $h$ with the horizontal lug or flange $h'$ carried by a vertical arm $h^2$ at one side of and secured by bolts $h^3$ to the outer part of a two-part clamp H hinged at $h^4$ (Fig. 12) and locked together by a bolt $h^3$ adapted to engage the free or flanged ends of the same, said two-part clamp being adapted to impinge upon the sleeve B so as to be rotated therewith, relative rotation being prevented by engaging the ends of the bolts $h^3$ in the body of the sleeve as shown.

The upper telescopic member G also carries the universal joint I connected to a stem $j$ dependent from what we will style the bottom disk J, the stem being formed hollow for the reception of the lamp-post K to the upper end of which the lamp D is pivoted at $d^2$ and adjustable as at $d'$ to various positions of inclination.

The disk J seats in a hollow base member L adapted to rest upon the fender and be firmly secured thereto and to the flattened extensions $e$ of the brace by hollow bolts $l$ passing through the thickened corner portions of the base member and through the fender and extension $e$ where the ends of the bolts are secured by nuts $l'$. The inner or hollow portions of the bolts are threaded as at $l^2$ for a purpose as will presently appear and the heads of the bolts are seated in recessed portions of the base member so that the upper surfaces of said heads are flush with the upper surface of the base member.

The base member has a substantially circular chamber L' on its interior and the disk J is correspondingly circular to permit movement in a rotary direction while maintaining these parts in place, the same being similarly true of what we term the upper or top disk M resting on the disk J and in the hollow portion L' of the base member, the whole being secured in place by a cap member N having bolts $n$ fastened through the cap and to the hollow headed portions of the bolts $l$ previously referred to.

The disk M carries a hollow stem portion $m$ to accommodate the lamp-post and a thumb-bolt $m'$ passing through alined apertures in the stem and post normally locking them together. To permit the stem to turn without turning the lamp-post, as is desirable in keeping with the purpose hereinafter brought out, the thumb-bolt $m'$ may be removed and engaged through a bracket $n'$ on the cap N and with an opposite aperture in the lamp-post, so that the elongated slotted portion $m^2$ of the stem may work over the bolt without engaging therewith.

The bottom disk J carries an upwardly projecting pin $j'$ adapted to enter a curved slot M' in the upward disk M so that said pin when moving in one direction will exhibit no influence on the disk M, but in the opposite direction will abut the end wall of the slot and rotate the same against the pressure of a coiled spring O interposed between the shoulder $o$ of the disk M and an integral stop $o'$ on the base member L projecting upwardly through a cutaway portion $o^2$ in the bottom disk J permitting the base member $l$ to rotate without interference from the stop $o'$. The action of the spring O is to normally, of course, relatively shift the parts to a predetermined position which will usually be that of the lamps facing directly ahead of the vehicle.

We have herein described the two disk and base elements as incorporated in connection with the lamp at one side of the vehicle, and we desire it understood that the corresponding elements employed in connection with the companion lamp at the opposite side of the vehicle are identical in construction save that they are the reverse of that shown in Figs. 7, 8 and 9 so that when one of the lamps is being turned the other remains inactive and vice versa.

With the foregoing in mind the operation will in all probability be understood without further definition but the operation may be followed as follows, to wit:

Assuming the thumb bolt $m'$ locks the stem of the disk M to the lamp-post K, it will be seen that a turning of the vehicle wheel under the operation of the customary steering mechanism will through the clamp H, secured to move with the sleeve B, and the universally actuated extensible rod G—G' rotate the disk J in a direction of the arrow (Fig. 7) causing the pin J' engaging the end wall of the slot M' to rotate the upper disk member M in opposition to the spring O, and the stem of the disk M being, as stated, fixedly secured to the lamp-post, the lamp will be bodily turned to the right being a direction of turning movement incident to steering the wheel A. The disk members associated with the opposite steering wheel being reversely formed, the pin J' in that instance will simply move unrestricted in the slot M' of the upper disk M, and the lamp will remain in its normal position, being that position where the rays of light are cast directly ahead.

A steering movement in a direction opposite to that just outlined, that is to say toward the left of the vehicle, will secure the reverse operation, the right hand lamp remaining in its normal position and the left hand lamp being turned toward the left as will be readily appreciated.

During the day time, or at other times when it is desired to obviate a constant unnecessary shifting of the lamps the coupling thumb bolt or screw $m'$ is removed and inserted at the place indicated by dotted lines, to prevent loss or misplacing of the same, and here by reason of the slotted portion $m^2$ of the stem of the disk M the latter may turn without affecting the lamp.

A further matter to be observed is that where there is but slight steering or turning movement to the right or left, and it is unnecessary to shift the lamps, as in relatively wide or more dangerous turns, the maintenance of the lamps in normal parallel or straight position, notwithstanding said slight deflection of the steering wheels, is accomplished by a slight play or freedom of lateral movement of the actuating member G' in its complemental or receiving member G enabling the former to turn to a limited extent without engaging the latter. This freedom for movement is indicated in Fig. 11.

Of course the fender $d$ is apertured for the passage of the stem $j$ and while it is preferable to bolt the base members to the fender, this is not necessary because as will be obvious the entire coupling construction inclosed by the cap N may occupy a position below the fender when the stem of the disk M will pass upwardly through the fender. This being readily understood by persons skilled in the art, a special illustration thereof is believed unnecessary.

Referring now to Figs. 13 to 17, inclusive, here it will be seen that an embodiment of the invention of somewhat simple construction is depicted.

Instead of having the universally mounted telescopic actuating rods of rectangular contour as shown in Fig 11, they are in this instance cylindrical, the upper member P being slotted as at $p$ for the reception of a detachable pin or screw $q$ on the lower member Q, the interfitting of the pin $q$ with the slotted portion $p$ being relatively loose to permit a relatively slight turning of the steering wheels and rod Q without effect on lamp, but compelling the turning of the upper member P at the end of such limited movement, to compel a corresponding turning of the lamp.

The lamp-post R in that embodiment of the invention now being described, fits in a hollow sleeve S universally connected to the actuating member P and having the enlarged upper end $s$ resting upon a base member T the latter being secured to the flattened end portion of the brace E by the bolts and nuts $t$, the sleeve S passing through the base member T and brace E as shown in Fig. 14. Retaining the sleeve S in place and inclosing the upper end thereof is a cap U one depending flange portion of which as at $u$ is cutaway along radial lines as is also a coincident portion $s'$ of the sleeve as shown in Fig. 16.

A headed pin V is carried by the lamp-post R and passes through the slotted or recessed portions $u$, $s'$, so that the head of the pin lies in an inwardly opensided spring pocket or housing W between one end of the housing and the adjacent end of a coiled spring X, the opposite end of the spring bearing against the opposite end of the housing, the housing being secured in fixed position on the base member T by flanges Y through which suitable screws pass into the base member.

A binding nut Z threaded on the lamp-post R and engaging the cap U holds the latter in position.

In operation, assuming the pin $q$ to be in position, the turning of the actuating rod in one direction will cause the end of the slotted or recessed portion $s'$ of the sleeve $s$, contacting with the shank of the pin V, to turn said pin and thereby the lamp-post against the pressure of the spring X, said spring subsequently restoring the parts to normal position. The actuating means for the other lamp is, as in the case of the first embodiment of our invention, the reverse of that illustrated, so that the turning of one of the lamps will permit the other to remain in straight or in normal position, the latter being enabled by the slot $s'$ permitting the sleeve to turn without actuating the pin V.

While we have herein illustrated a couple of embodiments of our invention it will be clear that the invention is capable of embodiment in still other forms and devices as may be embraced by the hereto appended claims.

What we claim is:—

1. The combination with a steering mechanism and a lamp, of means interposed between the steering mechanism and lamp and for permitting a limited movement of said steering mechanism without interference with the lamp light, but compelling a shifting of said light upon a continued movement of the mechanism comprising interfitting telescopic members, said members being formed to permit a limited lateral relative movement therebetween, for the purpose described.

2. The combination with a steering mechanism and a lamp, of means operatively associated therewith permitting movement of the steering mechanism to a limited extent without interference with the lamp light, but compelling a shifting of said light upon a continued movement of said mechanism, said means comprising telescopic members, one of said members being larger than and inclosing the other member and formed to permit a limited lateral movement between said members.

3. The combination with the body and the wheeled steering mechanism thereof, of a lamp supported from a part on the body, and means for shifting the lamp in consonance with the steering mechanism including universally coupled telescopic connections intermediate of the lamp and the wheeled steering mechanism, the telescopic members having a limited relative lateral movement, one of said members being connected with the lamp and the other with the steering mechanism, for the purpose described.

4. The combination with the body and the wheeled steering mechanism thereof including an upright, rotatable sleeve, of a lamp supported from a part on the body, and means for shifting the lamp in consonance with the steering mechanism comprising connection intermediate of the lamp and said rotatable sleeve including an approximately C-shaped bracket having a clamp at its lower terminal embracing said sleeve and a universal joint at its upper terminal, substantially as described.

5. The combination with the body and the wheeled steering mechanism thereof including an upright rotatable sleeve, of a lamp supported from a part on the body, and means for shifting the lamp in consonance with the steering mechanism comprising connections intermediate of the lamp and said rotatable sleeve including an approximately C-shaped bracket having a clamp at its lower terminal embracing said sleeve and a universal joint at its upper terminal with the telescoping extensions leading from the latter, substantially as described.

6. The combination with the body and the wheeled steering mechanism thereof including an upright rotatable sleeve, of a lamp supported from a part on the body, and means for shifting the lamp in consonance with the steering mechanism comprising connections intermediate of the lamp and said rotatable sleeve including a bracket having a clamp embracing said sleeve, and means supplemental to the clamp affording an interlock positively preventing relative rotation of the sleeve and clamp, substantially as described.

7. The combination with the body and the wheeled steering mechanism thereof including an upright rotatable sleeve, of a lamp supported from a part on the body, and means for shifting the lamp in consonance with the steering mechanism comprising connections intermediate of the lamp and said rotatable sleeve including an approximately C-shaped bracket having a clamp at its lower terminal embracing said sleeve, and telescoping extensions leading from its upper terminal, substantially as described.

8. The combination with a steering mechanism and a lamp, of means operatively associated therewith for permitting a limited movement of the mechanism without affecting the lamp, but adapted to shift the lamp upon a continued movement thereof, said means including rotatable members having interfitting portions, said rotatable members when the steering mechanism moves in one direction exerting no influence on the lamp, but compelling the shifting of the lamp upon a substantial movement of the steering mechanism in an opposite direction, substantially as described.

9. The combination with a body and the wheel steering mechanism thereof including a sleeve, of a lamp supported from said body, and means for shifting the lamp in consonance with the steering mechanism comprising upwardly disposed devices including a bracket fitted to said sleeve and extending upwardly and then having an angle portion overlying said sleeve and a rod portion having an operative connection with the lamp, and a universal joint connecting said bracket and said rod portion, said last mentioned joint being connected to the angle portion of the bracket overlying the sleeve, substantially as described.

10. The combination with a body and wheel steering mechanism therefor, including a vertically disposed sleeve, a lamp supported from a portion of the body and means for shifting the lamp in consonance with the steering mechanism comprising connections intermediate the lamp and the steering mechanism and including a bracket said bracket being secured to the sleeve and having a vertical portion extending above the same, the bracket also having an offset part overlying said sleeve and a universal joint disposed upon said offset part of the bracket and connected to the lamp operating mechanism, substantially as described.

11. In a vehicle, the combination with the steering wheels, of a lamp, means for shifting said lamp upon a movement of the steering wheels, said means permitting a limited movement of the steering wheels without interference with the lamp light, but compelling the shifting of said light upon a continued movement of the wheels comprising interfitting telescopic members, said members allowing a limited lateral movement between the same, substantially as described.

12. The combination with a steering mechanism and a lamp, of means operatively associated therewith for permitting a limited movement of the mechanism without affecting the lamp, but adapted to shift the lamp upon a continued movement thereof, said means including movable members disposed one upon another and having pin and socket connections therewith adapted when the steering mechanism moves in one direction to exert no influence upon the lamp but compelling the shifting of the lamp upon a substantial movement of the steering mechanism in an opposite direction, substantially as described.

13. The combination with a steering mechanism and a lamp, of means operatively associated therewith for permitting a limited movement of the mechanism without affecting the lamp light but adapted to shift the lamp light upon a continued movement thereof, said means including movable members having bearing surfaces and adapted to be disposed one upon another, one having an upstanding part and the other provided with a recess adapted when the steering mechanism moves in one direction to exert no influence upon the lamp light but compelling the shifting of the lamp light upon a substantial movement of the steering mechanism in an opposite direction, substantially as described.

CHESTER A. STAVES.
JOSEPH ANDERSON.

Witnesses:
F. A. PEEK,
M. M. SHANAPELT.